(12) United States Patent
Bethurum et al.

(10) Patent No.: US 11,275,550 B2
(45) Date of Patent: Mar. 15, 2022

(54) SYSTEMS FOR GENERATING AUDIO SIGNALS AND ASSOCIATED METHODS

(71) Applicant: Gogoro Inc., Hong Kong (CN)

(72) Inventors: Benjamin Neal Bethurum, Olympia, WA (US); Jia-Yang Wu, Taipei (TW)

(73) Assignee: Gogoro Inc., Hong Kong (CN)

( * ) Notice: Subject to any disclaimer, the term of this patent is extended or adjusted under 35 U.S.C. 154(b) by 65 days.

(21) Appl. No.: 16/468,511

(22) PCT Filed: May 24, 2018

(86) PCT No.: PCT/IB2018/000788
§ 371 (c)(1),
(2) Date: Jun. 11, 2019

(87) PCT Pub. No.: WO2018/215841
PCT Pub. Date: Nov. 29, 2018

(65) Prior Publication Data
US 2021/0232358 A1     Jul. 29, 2021

Related U.S. Application Data

(60) Provisional application No. 62/510,713, filed on May 24, 2017.

(51) Int. Cl.
*G06F 3/16* (2006.01)
*B60Q 9/00* (2006.01)
*H04R 1/22* (2006.01)

(52) U.S. Cl.
CPC .............. *G06F 3/165* (2013.01); *B60Q 9/00* (2013.01); *H04R 1/22* (2013.01); *H04R 2499/13* (2013.01)

(58) Field of Classification Search
CPC ...... B60Q 5/008; B60Q 9/00; H04R 2499/13; G06F 3/165
See application file for complete search history.

(56) References Cited

U.S. PATENT DOCUMENTS 8,179,234 B1 * 5/2012 Atwood .................. B60Q 5/008
340/384.3
8,665,081 B2 * 3/2014 Yoshino .................. B60Q 9/00
340/463

(Continued)

FOREIGN PATENT DOCUMENTS

EP     3166103 A1    5/2017

OTHER PUBLICATIONS

European Search Report received for co-pending EP Patent Application No. EP20169316.5; Applicant: Gogoro Inc, dated Nov. 16, 2020, 6 pages.

(Continued)

*Primary Examiner* — David L Ton
(74) *Attorney, Agent, or Firm* — Perkins Coie LLP

(57) ABSTRACT

The present disclosure is directed to methods, devices, and systems for playing audio signals associated with an electric in vehicle. The method includes, for example, (1) determining a speed of the electric vehicle; (2) receiving, from a memory, a plurality of sound frequency characteristics corresponding to the determined speed of the electric vehicle; and (3) generating an audio signal segment corresponding to the received sound frequency characteristics by a speaker of the electric vehicle. The sound frequency characteristics include a plurality of segments. Each of the segments includes an amplitude of a number of frequency characteristics in a sound produced by a powertrain assembly (e.g., an electric motor) in a speed range.

18 Claims, 9 Drawing Sheets

(56) References Cited

U.S. PATENT DOCUMENTS

| | | | | |
|---|---|---|---|---|
| 9,271,073 | B2* | 2/2016 | Valeri | G10K 15/02 |
| 9,758,096 | B1* | 9/2017 | Valeri | G10K 15/02 |
| 10,065,561 | B1* | 9/2018 | Bastyr | G10K 11/17883 |
| 2006/0074645 | A1 | 4/2006 | Tischer | |
| 2011/0010269 | A1* | 1/2011 | Ballard | G10K 15/02 |
| | | | | 705/26.41 |
| 2012/0106748 | A1 | 5/2012 | Peachey et al. | |
| 2013/0142352 | A1 | 6/2013 | Koch et al. | |
| 2015/0199955 | A1 | 7/2015 | Draganic | |
| 2015/0353007 | A1* | 12/2015 | Inoue | B60Q 5/00 |
| | | | | 381/61 |
| 2016/0016511 | A1 | 1/2016 | Mueller | |
| 2017/0043713 | A1 | 2/2017 | Sun et al. | |
| 2018/0001818 | A1* | 1/2018 | Reilly | H04R 3/00 |

OTHER PUBLICATIONS

European Search Report received for co-pending EP Patent Application No. 18805533.9; Applicant: Gogoro Inc, dated May 18, 2020, 4 pages.
International Written Opinion for PCT Application No. PCT/IB2018/00788; Applicant: Gogoro Inc., dated Nov. 29, 2018, 4 pages.
European Search Report received for co-pending EP Patent Application No. EP20169316.5; Applicant: Gogoro Inc, dated Aug. 4, 2020, 14 pages.

\* cited by examiner

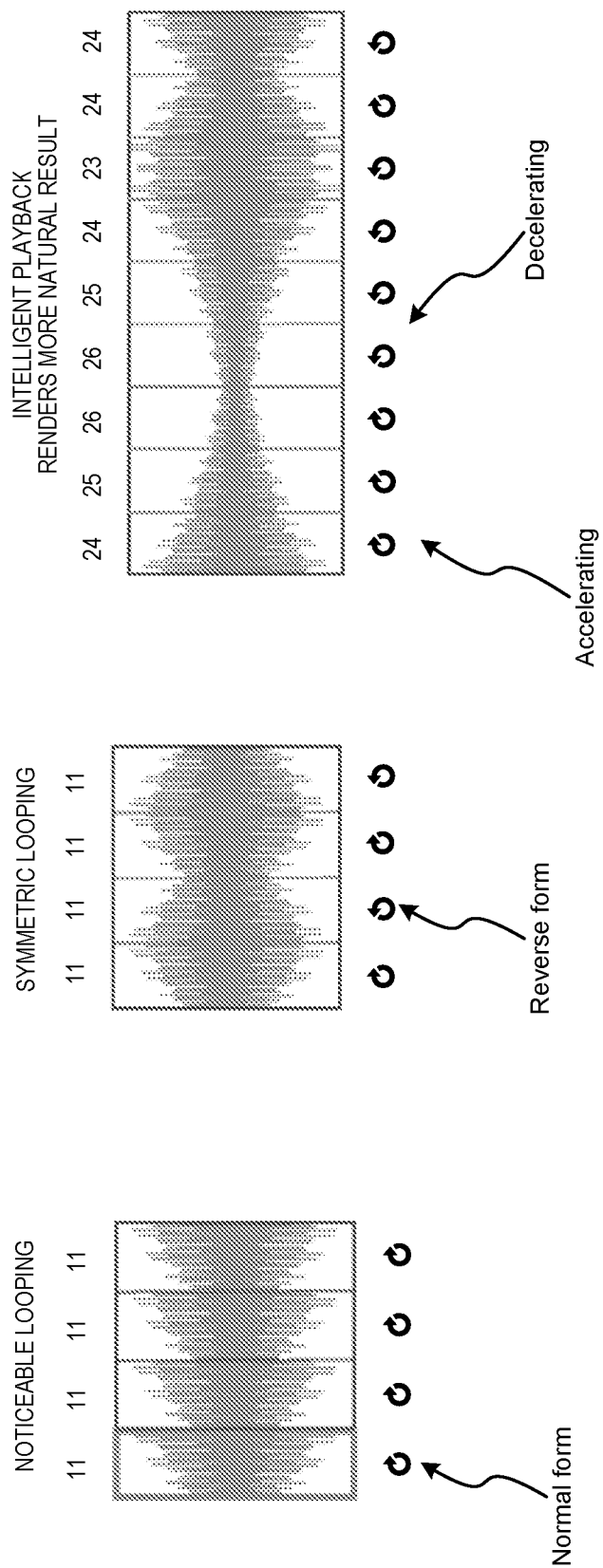

SYSTEMS FOR GENERATING AUDIO SIGNALS AND ASSOCIATED METHODS

CROSS-REFERENCE TO RELATED APPLICATION(S)

This application is a 371 U.S. National Phase application of PCT/IB2018/000788, filed May 24, 2018, which claims priority to U.S. Provisional Patent Application No. 62/510,713, filed May 24, 2017, the contents of which are incorporated herein by reference in their entireties.

TECHNICAL FIELD

The present technology is directed generally to methods and systems for generating audio signals associated with an electric motor of an electric vehicle. More particularly, the present technology is directed to systems for simulating the sound of the electric motor in a speed range and then playing similar sounds when the electric vehicle is in operation in that speed range so as to notify others the presence of the electric vehicle.

BACKGROUND

Generally speaking, electric motors are quieter than traditional combustion engines during operation, especially when the electric motor just starts to operate (e.g., at a lower rotational speed). However, some jurisdictions may require an electric vehicle to provide certain sounds as a warning or indication of the presence of that electric vehicle for safety reasons. Therefore, it is advantageous to have an improved apparatus, system and method to address the above-mentioned needs.

SUMMARY

The following summary is provided for the convenience of the reader and identifies several representative embodiments of the disclosed technology. Generally speaking, the present technology provides an improved system and method for generating audio signals associated with an electric motor (or a powertrain assembly, which can have an electric motor, a transmission belt, a transmission gear set, or other suitable devices driven by the electric motor) of an electric vehicle. The present technology is a way for generating and playing audio sounds that closely mimic how an electric vehicle sounds at different speeds. In one embodiment, the sounds generated by an electric motor of the electric vehicle are sampled in a sampling range (e.g., when the electric vehicle travels from 15 to 30 KPH, or kilometer per hour) when they are loud enough to be detected. The sampled sounds are analyzed and measured to identify certain frequency characteristics (e.g., identify certain frequencies associated with significant audio waves). Based on the identified frequency characteristics, a set of audio signals is synthesized corresponding to the sound of the electric motor in a larger target range (e.g., when the electric vehicle travels from 0 kilometer-per-hour, KPH, to its maximum speed). By this arrangement, the present technology can generate audio signals that provide an operator or other bystanders with a continuous, smooth, and "natural" sound when the electric vehicle is operating at any speed in the target range. The present technology also enables a user to customize the sound of the electric vehicle to generate various themes, thereby enhancing overall user experiences.

Another aspect of the present technology includes providing a method for analyzing measured sound from an electric motor or other devices on the vehicle (tire sounds, brakes etc.). In the analyzing process, the present technology can identify various dominant characteristic frequencies in the measured sound and their harmonics. In some embodiments, the amplitude of these identified frequencies is plotted versus the speed of the vehicle for a speed range in which the sounds are audible. The plot of the amplitude versus speed curves for the identified frequencies can then be interpolated or otherwise synthesized for a speed range in which the sounds of the vehicle are not generally audible. From the interpolated and measured frequency characteristics, a waveform is generated that represents the sounds of the vehicle at any speed (0 KPH to maximum KPH). The present technology can extrapolate, interpolate, or otherwise fit the identified characteristic frequency curves, so as to generate processed characteristic frequency curves in any range (e.g., a range that the electric motor can operate in), including a range that has no corresponding measured sound.

During operation of the vehicle, the synthesized waveform is played though a speaker so that bystanders can hear the vehicle approaching. In some embodiments, the waveform is further processed with a "fading-in" or "fading-out" function as shown in FIGS. 5 and 6 so that the artificially created vehicle sounds natural (as slower speeds) and blends in with the actual sounds of the vehicle (at higher speeds).

The present technology also provides methods for playing a smooth, continuous sound corresponding to an electric motor or other suitable devices. For example, the synthesized sound file can be divided into multiple segments or fragments. In one embodiment, each fragment is associated with a particular speed (e.g., one segment or fragment per speed unit, as shown in FIG. 6). For example, one fragment is associated with 11 KPH and another fragment associated with 12 KPH etc. Of course other associations are possible, e.g. a segment for a 2-4 KPH range and another for 4-6 KPH etc. The present technology plays the segment or fragment corresponding to a current status of the electric vehicle (e.g., the current traveling speed). To enhance the user experiences for a realistic generated sound, the segments are played in a manner that minimizes discontinuities. In one embodiment, segments are played in a forward direction when accelerating, are played in a reverse direction when decelerating and are played in a forward and reverse direction when travelling at the constant speed as shown in detail with reference to FIGS. 7-9.

In some embodiments, the disclosed technology can generate various types of sounds based on the sound from an electric motor, so as to provide customized user experiences. For example, the claimed technology can measure the sound from an electric motor and then analyze the sound at various base frequencies and identify the characteristics of the measured sound. The disclosed technology can then adjust the characteristics of the sound by increasing or decreasing the amplitude of the sound waves at the base frequencies.

In some embodiments, the disclosed technology can generate or simulate sounds in response to a user's operation of an electric motor. For example, the claimed technology can adjust the sound of the electric motor to make it sound like a supercar, a sports car, a train, a truck, other types of vehicles or devices, etc., when the user operates the electric motor.

In some embodiments, the disclosed technology enables a user to customize the sounds of an electric motor and accordingly enhances a user experience and the fun of operation. For example, a user can make an electric motor sound like a whirring spaceship (e.g., to simulate something from the future). By this arrangement, the disclosed technology can enhance user experience when operating the electric motor. In some embodiments, the disclosed technology can generate simulated sounds corresponding to user's action. In such embodiments, when the user requests the electric motor to increase its power output, the claimed technology can accordingly increase the volume of the simulated sounds.

In some embodiments, the sound from an electric motor or other devices can be measured, analyzed, and then played in a "real-time" manner. In such embodiments, for example, the disclosed technology can first measure/analyze the sound of an electric motor and then generate simulated sounds within a short period of time. In some embodiments, the claimed technology can constantly or periodically monitor the sound of an electric motor and adjust the simulated sounds accordingly.

In some embodiments, the present disclosure can be implemented as a method for playing audio signals associated with an electric vehicle. The method can include, for example, (1) determining a speed of the electric vehicle; (2) receiving, from a memory, a plurality of sound frequency characteristics corresponding to the determined speed of the electric vehicle; (3) generating an audio signal segment corresponding to the received sound frequency characteristics; and (4) playing the audio signal segment by a speaker of the electric vehicle. The sound frequency characteristics can include a plurality of segments, and each of the segments can include an amplitude of a number of frequency characteristics in a sound produced by a powertrain assembly in a speed range.

In some embodiments, the present disclosure can be implemented as an electric vehicle. The electric vehicle can include, for example, (1) a processor; (2) powertrain assembly coupled to the processor; (3) a memory coupled to the processor and configured to store a plurality of sound frequency characteristics corresponding to the electric vehicle; and (4) a speaker configured to play the audio signal segment. The sound frequency characteristics can include a plurality of segments, and each of the segments can include an amplitude of a number of frequency characteristics in a sound produced by the powertrain assembly in a speed range. The processor is configured to generate an audio signal segment based on a traveling speed of the electric vehicle and the sound frequency characteristics.

In some embodiments, the present disclosure can be implemented as a system (e.g., an Acoustic Vehicle Alerting System or Approaching Vehicle Audible Systems, abbreviated as AVAS) that can generate Vehicle Sound for Pedestrians (VSP). In such embodiments, the system can generate sounds based on characteristics of a powertrain assembly of an electric vehicle when the electric vehicle is in operation. The system can improve pedestrian safety by notifying pedestrians the existence of the electric vehicle.

Apparatuses, systems, and methods in accordance with embodiments of the present technology can include any one or a combination of any of the foregoing elements described above. The embodiments and various combinations of elements therein are only examples and are not intended to limit the scope of the present disclosure.

BRIEF DESCRIPTION OF THE DRAWINGS

FIGS. 7, 8, and 9 are schematic diagrams illustrating methods of playing the segments described in FIG. 6.

DETAILED DESCRIPTION

Figure 1:
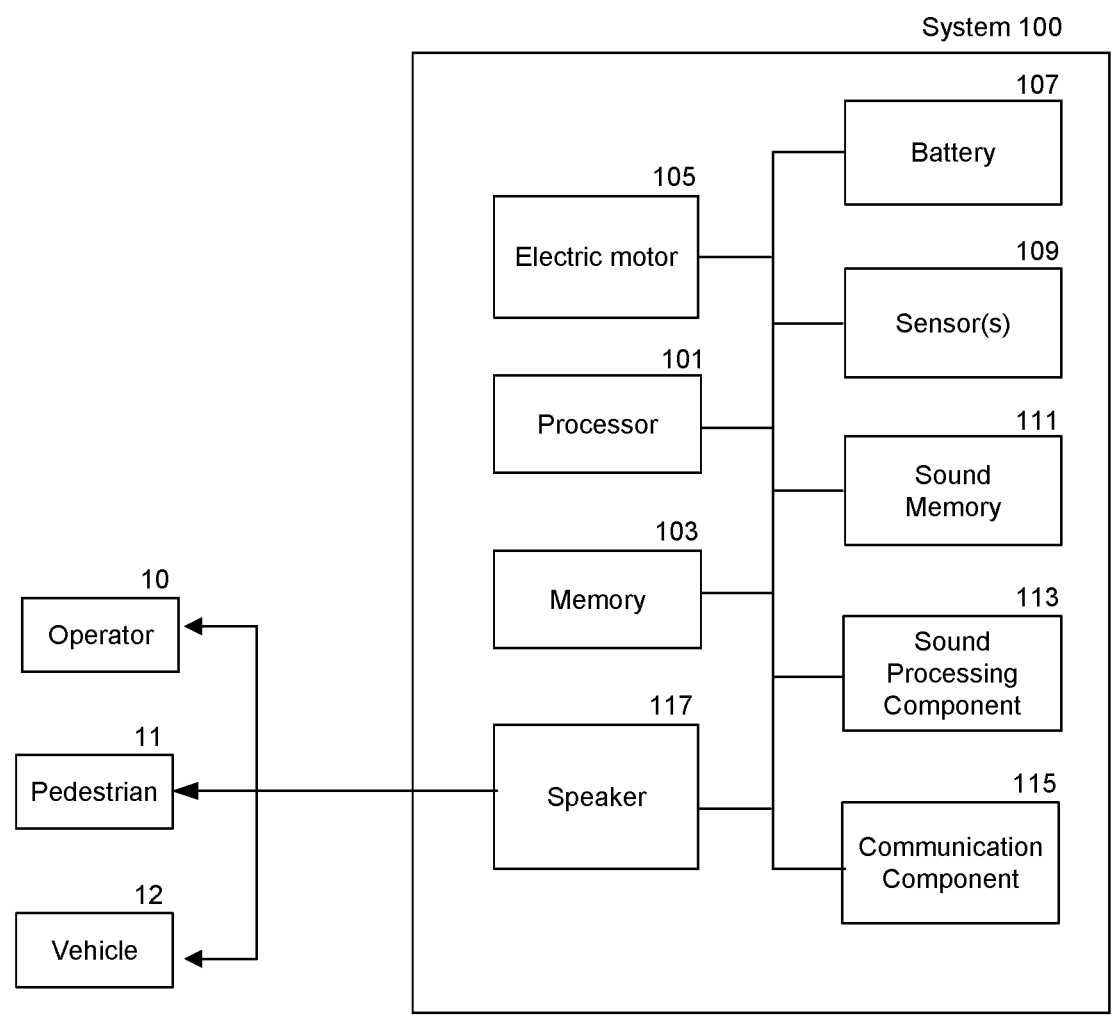
FIG. 1 is a block diagram illustrating a system configured in accordance with representative embodiments of the disclosed technology.

FIG. 1 is a block diagram illustrating a system 100 configured in accordance with representative embodiments of the disclosed technology. In some embodiments, the system 100 can be an electric vehicle such as an electric scooter, or a system that is attached and connected to an electric vehicle. The system 100 includes a processor 101, a memory 103 coupled to the processor 101, an electric motor 105 (or a powertrain assembly having an electric motor and other transmission elements/devices such as a belt, a chain, a gear set, etc.) configured to move the system 100, a battery 107 configured to power the electric motor 105, one or more sensors 109, and a communication component 115. The processor 101 can control other components in the system 100. The memory 103 can store instructions, signals, or other information associated with the system 100. The battery 107 provides power to the electric motor 105 such that the electric motor 105 can move the system 100. The sensors 109 are configured to measure and/or monitor the components and operating characteristics of the system 100. In some embodiments, the sensors 109 can include an audio sensor, a fluid pressure sensor, a temperature sensor, a speed sensor, a location sensor, a gyroscope, a torque sensor, etc. The communication component 115 is configured to communicate with other devices or systems (e.g., a smartphone of a user, a server that provides services to the system 100, a battery-swap station/kiosk, a vehicle, etc.) via one or more wireless connections, e.g., wide area network (WAN), local area network (LAN) or personal area network (PAN).

The system further includes a sound memory 111 configured to store digital audio signals or sound information associated with the system 100, a sound processing component 113 configured to adjust the sounds associated with the system 100, and a speaker 117 configured to play the sounds or audio signals associated with the system 100 to an operator 10, a pedestrian 11 and/or a driver/passenger of a vehicle 12. In some embodiments, the speaker 117 can be positioned to play the sounds in a particular direction (e.g., a traveling direction of the system 100).

In some embodiments, the sensor 109 includes a speedometer (or GPS sensor) that detects the speed of the system 100. The measure speed is fed to the processor 101 that is programmed to recall a sound fragment (e.g., a digital audio file) stored in the memory 103 or the sound memory 111 that is associated with the speed and provide the sound segment to the sound processing component 113 that conditions the sound segment for playback through the speaker 117. As will be discussed in further detail below, depending on the computing power onboard the system 100, the synthesized vehicle sounds (i.e., the sound segment/fragment) can be pre-loaded in the sound memory 111 from an analysis done in remote lab or computed/determined by the processing equipment on the system itself.

To produce a sound segment/sound file (e.g., a digital audio ".wav" file) that represents the sound of the system 100 over its operating speed range, the actual sounds of the system are recorded over a speed range in which they can be heard. In one embodiment, the sounds are recorded over a speed range (e.g., a speed range from 15 to 30 KPH) in which the system 100 generates significant audible signals that can be sensed with a microphone. In some embodiments, the sampling range can be an operating range of the electric motor 105 (e.g., 1000-3000 RPM).

Figures 2A, 2B:
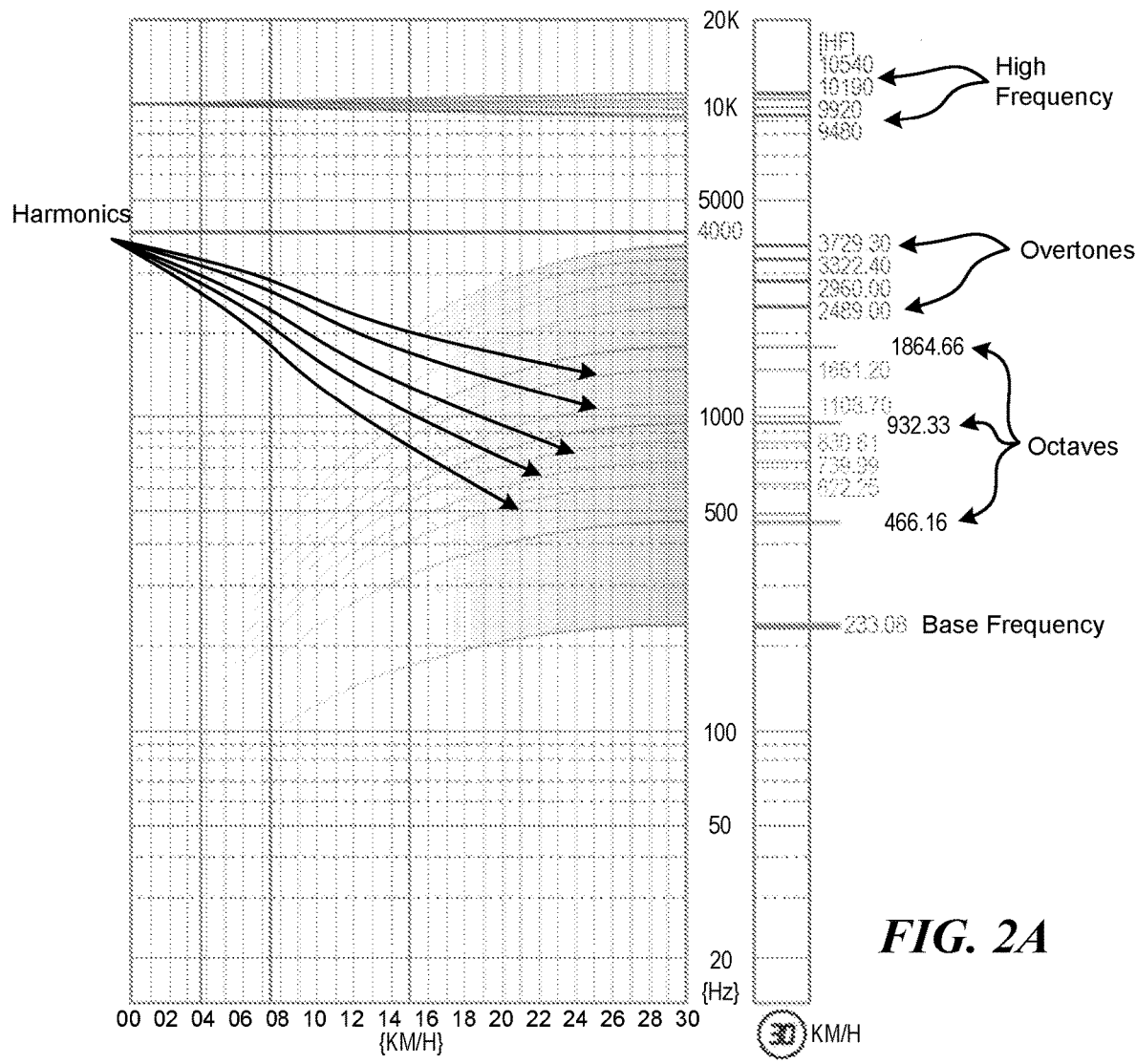
FIGS. 2A and 2B are schematic diagrams illustrating analyzed frequency characteristics in a sampling range in accordance with representative embodiments of the disclosed technology.

The sounds of the system 100 over the sampling range are stored in a digital memory and analyzed in the frequency domain to identify the dominant frequencies of the motor and the harmonics that give the motor its characteristic sound. These frequency components will typically vary in amplitude depending on the speed of the vehicle. For example, as shown in FIG. 2A, the base or fundamental frequency of the motor running at 30 KPH is measured at about 233 Hz, with significant octaves (i.e., overtones) measured at 466, 932, 1864, and 3729 Hz. Partial Harmonics are also detected at 622, 739, 830, 1108, 1661, 2217, 2489, 2960, and 3322 Hz. In other embodiments, the sound of the motor can be measured at various sets of base frequencies, depending on factors such as characteristics of the motor.

Figure 3:
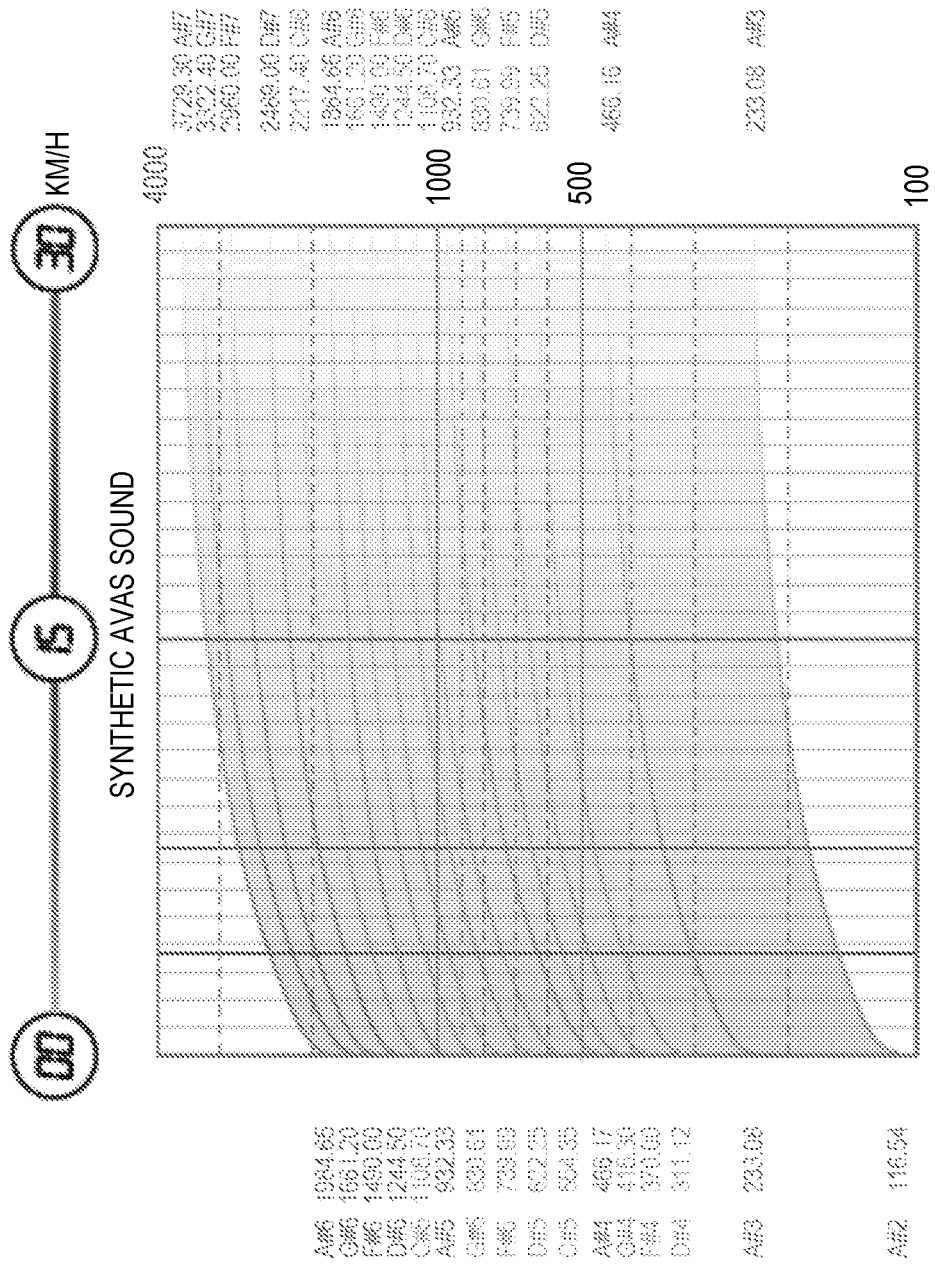
FIG. 3 is a schematic diagram illustrating generated frequency characteristics in a target range in accordance with representative embodiments of the disclosed technology.

As the speed or RPM decreases, the frequency of these detected signals lowers. The frequency of these detected components versus the speed of the vehicle (or RPM of the motor) is plotted to produce a series of curves as shown in FIG. 2A and FIG. 3. Based on the identified frequency characteristic plots, the curves are analyzed to predict what the frequency components would be in a range where the sounds generated by the system are generally inaudible during real world use (e.g., on street). For example, the target range of the predicted sounds can be determined for a speed range in which the system 100 operates (e.g., from 0 to maximum KPH).

In some embodiments, the frequency versus speed plots are analyzed by curve fitting methods (e.g., interpolation, splines, polynomial fitting etc.) to predict what the frequency components of the motor and its harmonics and overtones would be at speeds where the sounds are inaudible during use. Once the curves are fitted for the entire speed range of the system 100, a sound file such as a wave file is created for the entire speed range. Such a file can be relatively short so that it can be stored in an inexpensive memory of the system 100. This synthesized wave file can then be used to generate sounds to be played by the speaker 117.

In some embodiments, the sound processing component 113 can further adjust the set of synthesized audio signals for customized user experiences. For example, the sound processing component 113 can "fade-in" the set of synthesized audio signals with a parabolic function and/or "fade-out" the same by a linear function (see, e.g., FIG. 5).

In some embodiments, the sound file is divided into multiple segments. For example, each of the multiple segments can correspond to a particular speed range (e.g., one KPH). The segments can be generated and stored in the sound memory 111 for further use. For example, the processor 101 can be programmed to play the stored segments corresponding to the current traveling speed of the system 100.

In some embodiments, the stored segments can be played in a forward or reverse direction to provide a natural sound for the user. In some embodiments, the direction in which the stored segments are played is determined in accordance with a change of the traveling speed (e.g., acceleration or deceleration). Details of such embodiments are discussed below with reference to FIGS. 7-9.

In some embodiments, the creation of the sound file (i.e., the sound signal segment/fragment) that represents the sound of the system 100 (e.g., a vehicle) is done in a lab based on recordings of the vehicle. The sound file is then stored in the vehicle at the time of manufacture. In other embodiments, the sound file of the vehicle can be included in software updates to an existing vehicle through a wired or wireless connection (e.g., through a smartphone tethered to the vehicle). In still other embodiments, depending on the processing power (e.g., the processing power of the processor 101 depicted in FIG. 1) available on the vehicle, the sound file can be generated on the vehicle itself. For example, the vehicle may include a microphone positioned to detect the sounds created as the user is instructed to drive at certain speeds. The sounds are recorded, stored in memory and analyzed by a signal processor on board the vehicle to produce the sound file in a manner similar to that performed in the lab. The generated segments can then be stored in the sound memory 111. The speaker 117 can then play these segments in the ways described above. In some embodiments, the segments can be stored as firmware of the system 100.

FIGS. 2A and 2B are schematic diagrams illustrating analyzed frequency characteristics in a sampling range in accordance with representative embodiments of the disclosed technology. In FIG. 2A, three different categories of frequencies are identified in a sampling range from speeds 15 to 30 KPH.

The most prominent frequencies can be identified as a base frequency and its overtones and partial harmonics. High frequency components can also be identified but in one embodiment these higher frequency signals are ignored. In the illustrated embodiments, the base frequency is the most prominent frequency in the sampling range (e.g., having the largest amplitude among the audio waves at all frequencies). As shown in FIG. 2A, the base frequency is about 233 hertz at 30 KPH.

The "overtones" category refers to the audio waves that can form overtones of the base frequency (e.g., any oscillation whose frequency is an integral multiple of the base frequency, excluding the base frequency). In the illustrated embodiments, the "overtones" can range from about 466 to 3729 hertz.

The "partial harmonics" category refers to the audio waves that can form harmonics of the base frequency (e.g., any oscillation whose frequency is an integral multiple of the base frequency, including the base frequency). In the illustrated embodiments, the "partial harmonics" can range from about 622 to 3322 hertz.

As shown in FIG. 2A, the frequency characteristics are plotted or analyzed as frequency characteristic curves. The identified frequency characteristics shown in FIG. 2A are used to generate frequency characteristics in a range for speeds where the vehicle is generally inaudible. By so doing, the generated frequency characteristics in the target range can "preserve" the major characteristics of an original sound source (e.g., the electric motor 105). Accordingly, the generated frequency characteristics can be used to simulate the sound generated by the original sound source.

FIG. 3 is a schematic diagram illustrating generated frequency characteristics in a target range in accordance with representative embodiments of the disclosed technology. In the illustrated embodiments, the target range is a speed range from zero to 30 KPH. As shown, the generated frequency characteristics are in the form of frequency characteristic curves. The curves shown in FIG. 3 can be generated from the curves shown in FIG. 2A by extrapolation, interpolation, curve-fitting, and/or other suitable algorithms. In some embodiments, the generated frequency characteristics can be formed based on empirical study (e.g., a study based on user experiences). As shown, the generated curves in FIG. 3 cover a range (e.g., 0-30 KPH) greater than the curves in FIG. 2A (e.g., 15-30 KPH). As a result, the generated curves in FIG. 3 can be used to create sounds that "sound like" the original sound source (e.g., the sound of the powertrain assembly of the vehicle with system 100 integrated) in a target range greater than the sampling range.

Once the frequency-versus-speed curves are determined for the entire expected operating speeds of the vehicle, the sound file is generated. Depending on the fidelity required, the speaker to be used and other audio engineering factors, the sound file can be quite short. In one embodiment, a sound file of 1.8 seconds of sufficient to store represent the sound of an electric scooter at speed ranges of 0 to 30 KPH. The sound file reproduces the frequency of the different frequency components at each speed.

Figure 4:
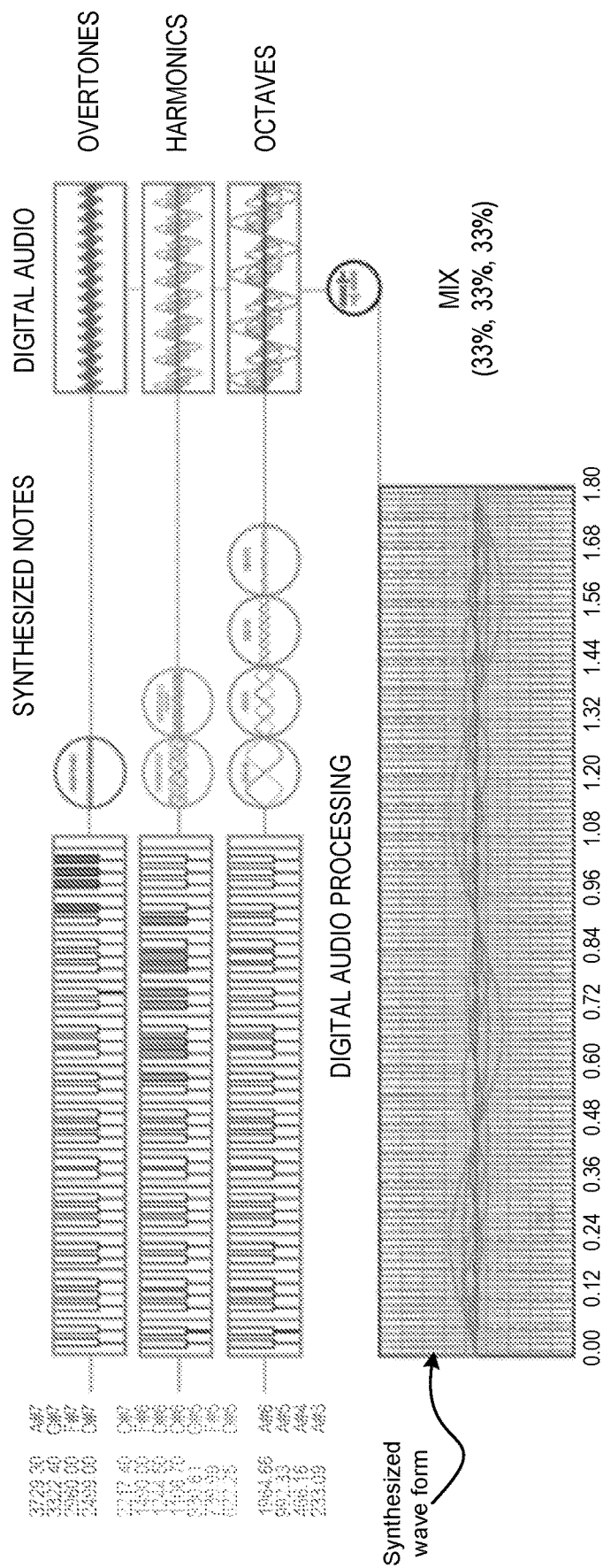
FIG. 4 is a schematic diagram illustrating a synthesized waveform based on generated frequency characteristics in accordance with representative embodiments of the disclosed technology.

FIG. 4 is a schematic diagram illustrating a synthesized waveform based on generated frequency characteristics in accordance with representative embodiments of the disclosed technology. The synthesized waveform can be created by synthesizing or combining audio waves from multiple frequency categories (e.g., the "base frequency," "overtones" and "partial harmonics" categories described above).

In the illustrated embodiments, the synthesized waveform is created by combining the waves from the "overtones," and "partial harmonics" categories by equal weighting (e.g., one half per category) of amplitude. In other embodiments, the synthesized waveform can be created by different combinations of categories with various ratios, depending on multiple factors such as providing different audio themes to users.

Figure 5:
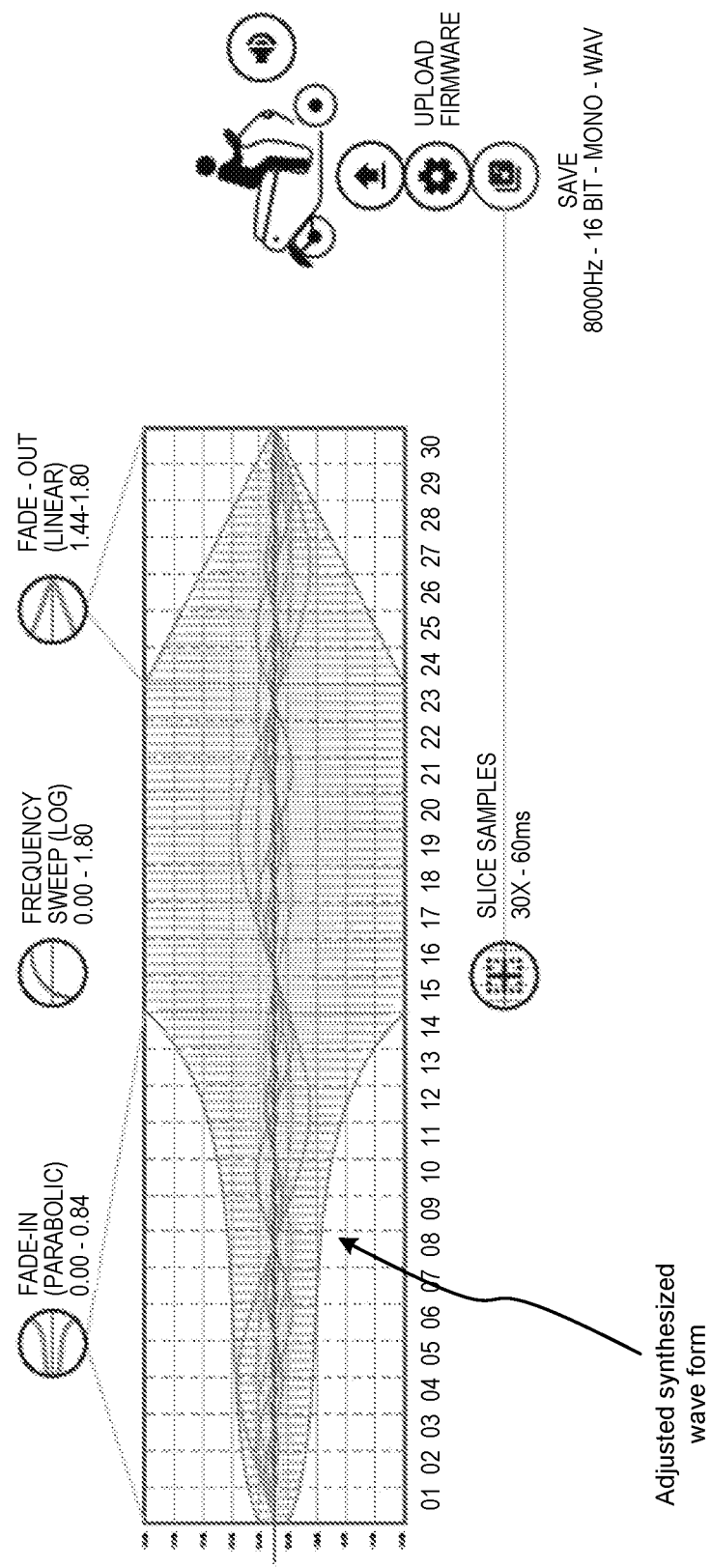
FIG. 5 is a schematic diagram illustrating an adjusted synthesized waveform in accordance with representative embodiments of the disclosed technology.

FIG. 5 is a schematic diagram illustrating an adjusted synthesized waveform in accordance with representative embodiments of the disclosed technology. In some embodiments, the synthesized waveform in FIG. 4 can be further adjusted as it is played back. The amplitude of the envelope of the synthesized waveform would correspond to the volume of the speaker when playing the audio signals. In the illustrated embodiments, the synthesized waveform can be adjusted by "fading-in" based on a parabolic function in a first speed range from 0 to 14 KPH, a flat response from about 14.5-23.5 KPH and a linear reduction in waveform amplitude from 23.5-30 KPH. This can create, for example, a natural sounding vehicle that mimics how the sound of the vehicle increases with increasing speed and then reduces the contribution of the synthesized sound as the actual sounds of the vehicle become heard. The incremental waveform provides a smooth sound to users or bystanders. In a second speed range (e.g., from 14.5 to 23.5 KPH), the synthesized waveform can be played at full volume. In a third speed range (e.g., from 23.5-30 KPH), the synthesized waveform can be adjusted by "fading out" based on a linear function as the natural sound of the vehicle increases with speed. Therefore, to provide a smooth, natural audio user experience, the present technology can fade out the waveform in the third speed range. In other embodiments, the synthesized waveform can be adjusted by other suitable functions. Intervals of the first, second and third speed ranges may vary based on the volume of the sound produced by the vehicle itself. For example, a vehicle with a quieter powertrain assembly may produce sound that is loud enough for the pedestrian to notice only when the speed of this vehicle is over 60 KPH, then the first, second and third speed range could be set as 0-20 KPH, 20-40 KPH and 40-60 KPH.

Figure 6:
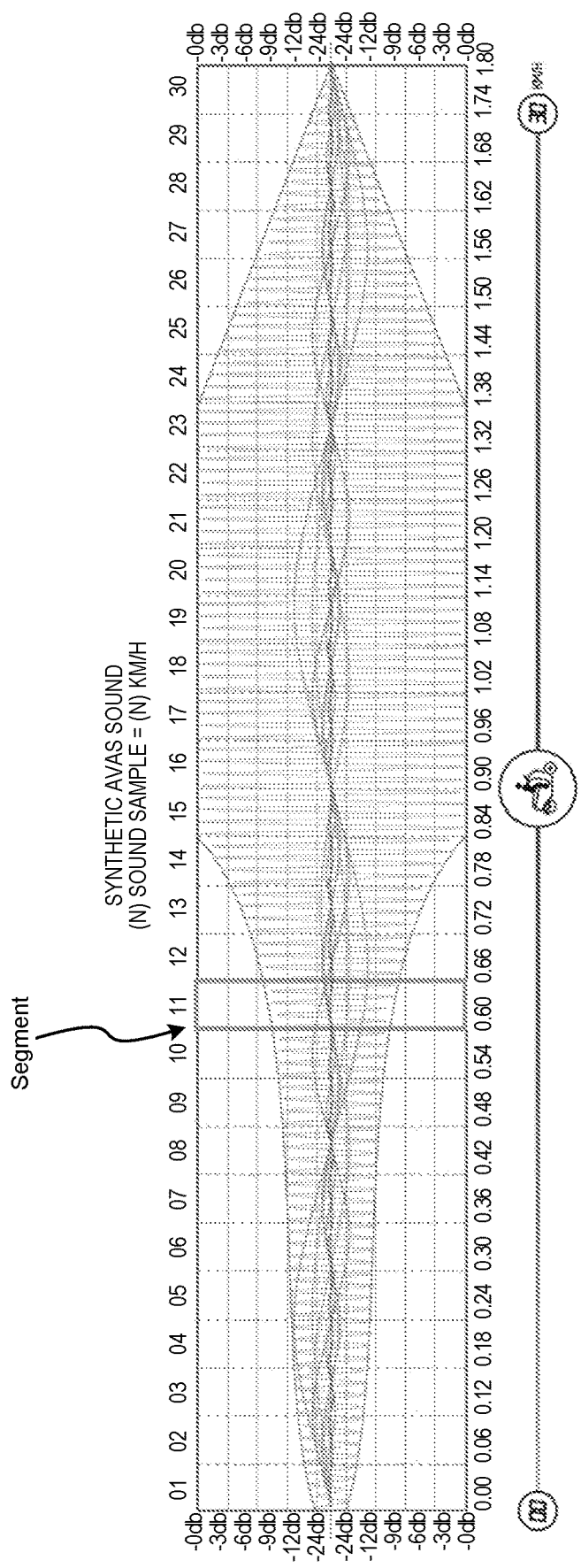
FIG. 6 is a schematic diagram illustrating segments of the adjusted synthesized waveform described in FIG. 5.

FIG. 6 is a schematic diagram illustrating segments of the adjusted synthesized waveform described in FIG. 5. The synthesized waveform can be divided into multiple audio signal segments. In one embodiment each 1 KPH speed difference is associated with a 60 millisecond segment of the audio file. As shown, the synthesized waveform is divided into segments based on the traveling speed of a system or an electric vehicle (e.g., one segment per speed unit). The segments corresponding to the detected speed of the vehicle are played through the speaker on the vehicle.

FIGS. 7, 8, and 9 are schematic diagrams illustrating methods of playing the segments described in FIG. 6. The present technology can play the segments either in a normal (e.g., forward) direction/form or in a reverse direction, depending on the speed of the vehicle In one embodiment, the speed of the vehicle is detected at the same rate as the length of the audio file, e.g., every 60 milliseconds. If the speed of the vehicle is increasing then the corresponding audio segments are played in the forward direction. If the speed of the vehicle is detected as decreasing, then the corresponding audio segments are played in the reverse direction. In one embodiment, in order to avoid a noticeable audio discontinuity when the vehicle is maintaining a constant speed, the audio segments are played forwards and backwards or vice versa.

In the embodiments shown in FIG. 8, when the electric vehicle is traveling at the same speed, the audio segment can be played first in the forward direction and then in an opposite direction (e.g., reverse direction). The process then repeats for as long as the vehicle maintains the same speed. This arrangement provides a smooth waveform (e.g., compared to playing the segment from beginning to end and then starting again at the beginning as shown in FIG. 7).

In some embodiments, when the electric vehicle is accelerating, the segments can all be played in normal form (e.g., in FIG. 9, the speed accelerates from 24 to 26 KPH and the segment for 24 KPH is played in the forward direction starting at the beginning followed by the segment for 25 KPH in the forward direction, etc.). In some embodiments, when the electric vehicle is decelerating, the next segment can be played in reverse form (e.g., in FIG. 9, the speed decelerates from 26 to 24 KPH and the segment for 26 KPH is played in the reverse direction followed by playing the segment for 25 KPH in the reverse direction etc.). By this arrangement, the present technology can play the overall waveform in a smooth and continuous manner, which enhances a user's experience.

Figure 10:
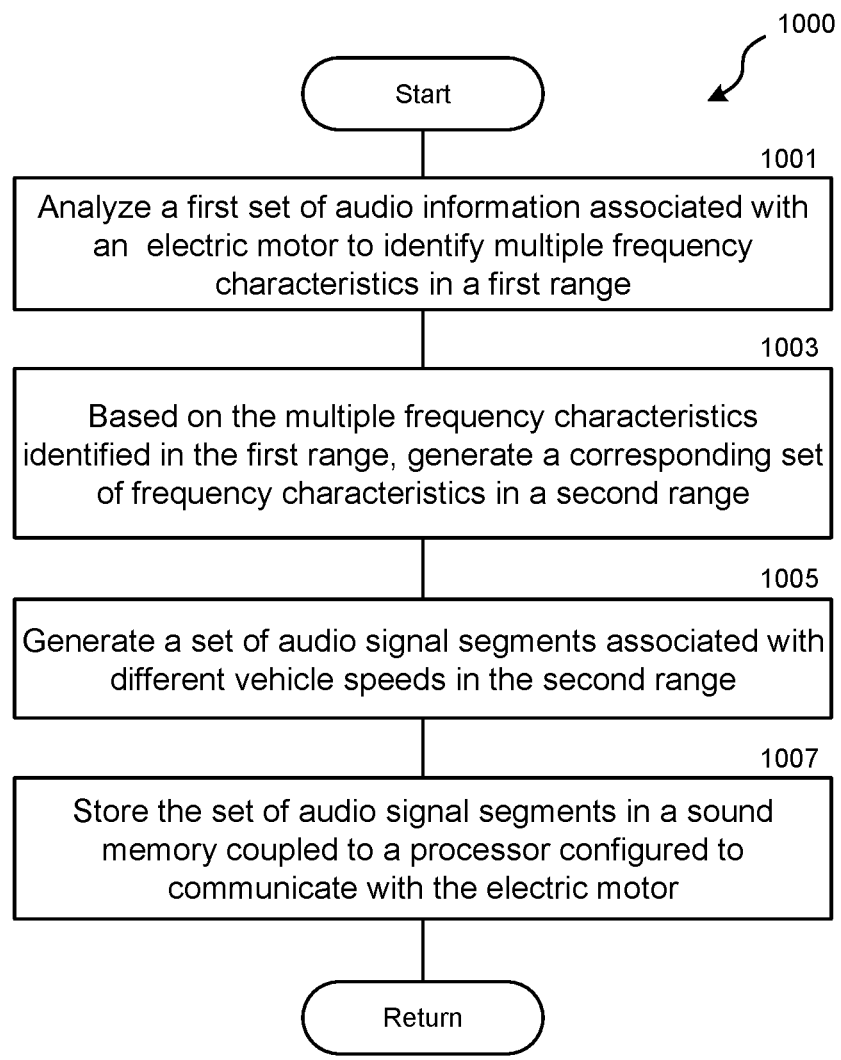
FIGS. 10 and 11 are flowcharts illustrating embodiments in accordance with the present technology.

FIG. 10 is a flowchart showing a method 1000 for generating audio signals associated with an electric motor of an electric vehicle (e.g., to simulate sounds when operating the electric motor). In some embodiments, the method 1000 can be implemented in a system (e.g., the system 100) of the present disclosure. In some embodiments, the method 1000 can be implemented in an electric vehicle. In some embodiments, the method 1000 can be used to configure a vehicular sound system. For example, the vehicular sound system can include a processor and a sound memory/storage coupled to the processor. In such embodiments, the method 1000 can generate audio segments based on analysis (e.g., embodiments discussed herein with reference to FIGS. 1-2B) and store the audio segments in the sound memory. Once done, the audio segments stored in the sound memory can be readily used (e.g., to be played by a speaker associated with the vehicular sound system).

As shown in FIG. 10, the method 1000 states at block 1001 by analyzing a first set of audio information associated with the electric motor to identify multiple frequency characteristics of the audio information in a first range. In some embodiments, the first set of audio information can be measured by an audio sensor (e.g., a microphone). In some embodiments the multiple frequency characteristics include audio waves at various frequencies (e.g., embodiments discussed above with reference to FIGS. 2A and 2B). In some embodiments, the first range can be a sampling range (e.g., a sampling range decided by vehicle speed or by motor speed). In some embodiments, the multiple frequency characteristics can be in form of frequency characteristic curves/lines. In some embodiments, the multiple frequency characteristics can include an amplitude of a base frequency, overtones and harmonics versus vehicle speed. In some embodiments, the multiple characteristic frequencies can include high frequencies ranging from about 9460 to 10540 hertz, overtone frequencies ranging from about 466 to 3729 hertz, harmonic frequencies ranging from about 622 to 3322 hertz, and a base frequency about 233 hertz. In some embodiments, the multiple frequency characteristics can be determined at least based on a character of a speaker of the electric vehicle (e.g., such that the corresponding audio segments can be well played by that speaker).

At block 1003, the method 1000 continues to generate a corresponding set of frequency characteristics in a second range, based on the multiple frequency characteristics identified in the first range. In some embodiments, the second range can be a vehicle-speed range (e.g., 0-30 KPH) greater than the first range (e.g., 15-30 KPH). At block 1005, the method 1000 continues to generate a set of audio signal segments associated with different vehicle speeds in the second range. In some embodiments, the audio signal segments can be the segment (e.g., a set of audio waves corresponding to a vehicle speed range) discussed above with reference to FIG. 6. At block 1005, the method 1000 then stores the set of audio signal segments in a sound memory. The sound memory is coupled to a processor of the electric motor. The processor is configured to control or communicate with the electric motor. In some embodiments, the processor can be an engine control unit. Once the audio signal segments are stored in the sound memory, they are readily to be played (e.g., to simulate the sounds of the electric motor) when an operator operates the electric vehicle.

In some embodiments, the method 1000 can further include (1) determining the first range to be measured; and (2) operating the electric motor in the first range. The first range can correspond to a first vehicle speed range between a first speed (e.g., 15 KPH) of the electric vehicle and a second speed (e.g., 30 KPH) of the electric vehicle. The method 1000 can also include (1) measuring audio signals generated by the electric motor when the electric motor is operating in the first range; and (2) identifying the multiple frequency characteristics based on the measured audio signals. In some embodiments, the second range can correspond to a second vehicle speed range between a third speed (e.g., 0 KPH) of the electric vehicle and the second speed (e.g., 30 KPH) of the electric vehicle.

In some embodiments, the method 1000 can include adjusting the corresponding set of frequency characteristics in the second range by fading in the corresponding set of frequency characteristics in a "fade-in" range or a "fade-out" range. Embodiments regarding these "fade-in" and "fade-out" features are discussed above with reference to the sound processing component 113 and FIG. 5.

Figure 11:
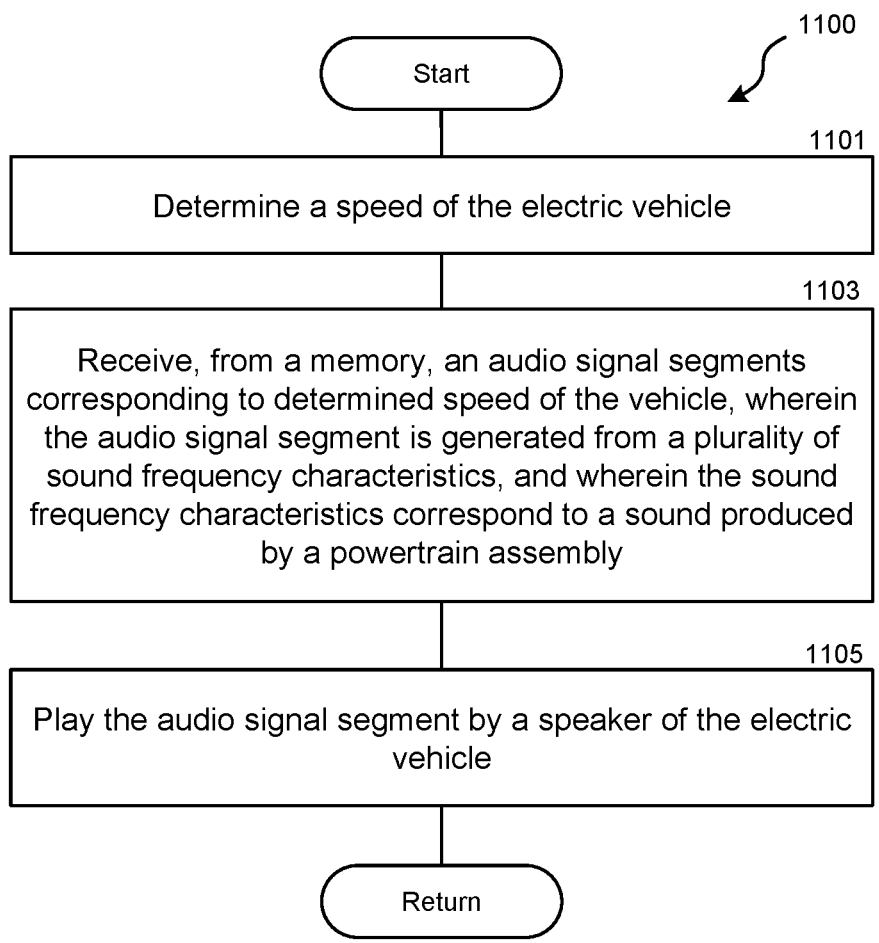

FIG. 11 is a flowchart showing a method 1100 for playing audio signals associated with of an electric vehicle (e.g., to simulate the sounds of the powertrain assembly, specifically, the electric motor). In some embodiments, the method 1100 can be implemented in a system (e.g., system 100) of the present disclosure. In some embodiments, the method 1100 can be implemented in an electric vehicle. In some embodiments, the method 1100 can be used to configure a vehicular sound system. For example, the vehicular sound system can include a processor and a sound memory/storage coupled to the processor. In such embodiments, the method 1100 can play pre-stored audio segments by a speaker associated with the vehicular sound system.

At block 1101, the method 1100 starts by determining a speed of the electric vehicle. In some embodiments, this can be done via a speed sensor or a speedometer. At block 1103, the method 1100 continues to receive, from a memory (e.g., the sound memory discussed herein), an audio signal segment corresponding to the determined speed of the vehicle. The audio segment is generated from a plurality of sound frequency characteristics corresponding to the determined speed of the electric vehicle. Specifically, the audio signal segment is generated from a plurality of sound frequency characteristics, and the sound frequency characteristics correspond to a sound produced by a powertrain assembly in a speed range. In some embodiments, the sound frequency characteristics can include a plurality of segments, and each of the segments can include an amplitude of a number of frequency characteristics in a sound produced by the electric motor versus speed of the electric motor in a speed range (e.g., a speed range that the electric vehicle can travel. The production of the audio signal segments could be referred to embodiment described in FIG. 1-4. At block 1105, the method 1100 then plays the audio signal segment corresponding to the received sound frequency characteristics by a speaker of the electric vehicle.

In some embodiments, the method 1100 can adjust an amplitude of the audio signal segment based on the determined speed of the electric vehicle. In other words, the speaker can play different audio segments at different vehicle speeds. For example, as described in embodiment corresponding to FIG. 5, while the speed of the electric vehicle increase from the first speed range, to the second speed range and the third speed range, not only the speaker plays different audio segments that corresponds to different speed of the vehicle, but also the volume/amplitude the speaker is adjusted from gradually increase (e.g., fade in based on parabolic function), full volume, and then decrease (e.g., fade out based on linear function), and vice versa. In some embodiments, the method 1100 can play the audio segments in various fashions. For example, in some embodiments, the method 1100 can play an audio segment in the forward/reverse directions. In some embodiments, when the electric vehicle is accelerating, the method 1100 can play the segments in a forward manner. In some embodiments, when the electric vehicle is decelerating, the method 1100 can playing the segments in a reverse manner. In some embodiments, when the speed of the electric vehicle is generally (e.g., plus or minus 10%) the same, the method 1100 can repeatedly play one segment in the forward and reverse directions. Embodiments regarding playing audio segments in the forward/reverse directions are discussed in detail above with reference to FIGS. 7-9.

In some embodiments, the audio segments can be stored in a sound memory or storage. When the system wants to play an audio segment, the system can then access the sound memory to retrieve that audio segment. In some embodiments, the system can retrieve multiple audio segments (e.g., most frequently played ones) and then store them in a cache coupled to or within a processor, such that these audio segments can be played quickly and effectively.

From the foregoing, it will be appreciated that specific embodiments of the technology have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall with within the scope of the present technology. Accordingly, the present disclosure and associated technology can encompass other embodiments not expressly shown or described herein.

We claim:

1. A method for playing audio signals associated with an electric vehicle, the method comprising:
    determining a speed of the electric vehicle;
    receiving, from a memory, an audio signal segment corresponding to the determined speed of the vehicle, wherein the audio signal segment is generated from a plurality of sound frequency characteristics, and wherein the sound frequency characteristics correspond to a sound produced by a powertrain assembly; and
    playing the audio segment by a speaker of the electric vehicle,
    wherein the audio signal segment includes a first audio signal segment and a second audio signal segment; and
    wherein at least one of the first and second segments is played in a reverse manner.

2. The method of claim 1, further comprising:
    receiving, from the memory, a plurality of sound frequency characteristics corresponding to the determined speed of the electric vehicle, wherein the sound frequency characteristics include a plurality of segments, and wherein each of the segments includes an amplitude of a number of frequency characteristics in the sound produced by the powertrain assembly in the speed range; and
    generating the audio signal segment corresponding to the received sound frequency characteristics.

3. The method of claim 1, wherein the powertrain assembly includes an electric motor.

4. The method of claim 1, further comprising:
    adjusting an amplitude of the audio signal segment based on the determined speed of the electric vehicle.

5. The method of claim 4, further comprising:
    increasing volume of the speaker when it is determined that the speed of the electric vehicle is increasing in a first speed range;
    setting the volume of the speaker in full volume when it is determined that the speed of the vehicle is in a second speed range; and
    decreasing the volume of the speaker when it is determined that the speed of the electric vehicle is increasing in a third speed range.

6. The method of claim 1, wherein the speed of the electric vehicle is a first traveling speed at a first time, and wherein the method further comprises:
    determining a second traveling speed of the electric vehicle at a second time;
    generating the second audio signal segment based on the received sound frequency characteristics; and
    playing the second audio signal segment by the speaker of the electric vehicle.

7. The method of claim 6, further comprising:
    when the first traveling speed is lower than the second traveling speed, playing the first and second segments in a forward manner.

8. The method of claim 6, wherein:
    the first traveling speed is higher than the second traveling speed.

9. The method of claim 1, wherein the speed of the electric vehicle is a first traveling speed at a first time, and wherein the audio signal segment is a first audio signal segment, and wherein the method further comprises:
    determining a second traveling speed of the electric vehicle at a second time; and
    when the second traveling speed is generally the same as the first traveling speed, playing the first segment in a reverse manner.

10. An electric vehicle, comprising:
    a processor;
    a powertrain assembly coupled to the processor;
    a memory, coupled to the processor, configured to store a plurality of audio signal segments, wherein each of the audio signal segments is generated from a plurality of sound frequency characteristics corresponding to the electric vehicle, wherein the sound frequency characteristics include a plurality of segments corresponding to a number of frequency characteristics in a sound produced by a powertrain assembly, wherein the plurality of audio signal segments include a first audio signal segment and a second audio signal segment, and wherein at least one of the first and second segments is played in a reverse manner; and
    a speaker configured to play the audio signal segment.

11. The electric vehicle of claim 10, wherein each of the segments includes an amplitude of the number of frequency characteristics in the sound produced by the powertrain assembly in the speed range, and wherein the processor is configured to generate an audio signal segment based on a traveling speed of the electric vehicle and the sound frequency characteristics.

12. The electric vehicle of claim 10, wherein the powertrain assembly includes an electric motor.

13. The electric vehicle of claim 10, wherein the powertrain assembly includes an electric motor, a transmission belt, and a transmission gear set.

14. The electric vehicle of claim 10, wherein the processor adjusts an amplitude of the audio signal segment played by the speaker based on the determined speed of the vehicle.

15. A method for playing audio signals associated with an electric vehicle, the method comprising:
    receiving, from a sound memory, a plurality of sound frequency characteristics corresponding to a speed range of the electric vehicle, wherein the sound frequency characteristics include a plurality of segments, and wherein each of the segments includes an amplitude of a number of frequency characteristics in a sound produced by a powertrain assembly in a speed range;

determining a current traveling speed of the electric vehicle;

generating a first audio signal segment corresponding to the received sound frequency characteristics;

playing the first audio signal segment by a speaker of the electric vehicle;

determining whether the electric vehicle is accelerating, decelerating, or keeping the current traveling speed;

based on the determination, generating a second audio signal segment corresponding to the received sound frequency characteristics; and playing the second audio signal segment by the speaker of the electric vehicle, wherein at least one of the first and second segments is played in a reverse manner.

16. The method of claim 15, further comprising:

when the first traveling speed is lower than the second traveling speed, playing the first and second segments in a forward manner.

17. The method of claim 15, further comprising:

when the first traveling speed is higher than the second traveling speed, playing at least one of the first and second segments in the reverse manner.

18. The method of claim 15, further comprises:

when the second traveling speed is generally the same as the first traveling speed, playing the first audio signal segment in a reverse manner as the second audio signal segment.

* * * * *